Aug. 8, 1939.　　B. A. HULTQUIST　　2,168,988
ADJUSTABLE TRIPOD HEAD
Filed June 9, 1936

Bernard A. Hultquist
INVENTOR.

BY

ATTORNEYS

Patented Aug. 8, 1939

2,168,988

UNITED STATES PATENT OFFICE 2,168,988

ADJUSTABLE TRIPOD HEAD

Bernard A. Hultquist, Rochester, N. Y., assignor, by mesne assignments, to Eastman Kodak Company, Rochester, N. Y., a corporation of New Jersey Application June 9, 1936, Serial No. 84,316

3 Claims. (Cl. 248—181)

This invention relates to a tripod stand adapted for supporting cameras, surveying instruments, and the like, and particularly to a novel ball and socket joint for an adjustable head therefor, said socket being provided with a pair of adjustments, one for setting up an additional frictional grip in the joint, and another for rigidly attaching the ball and socket in a given locked position, the effectiveness of the latter adjustment depending upon the setting of the first adjustment.

In the use of tripods where the head on which the instrument is to be mounted is designed to be universally adjustable, many different forms of adjustable joints have been used, but the ball and socket joints have been found very desirable for this purpose. If a tripod head is adjustably mounted on a stand by means of a ball and socket joint, some degree of initial friction between the ball and socket must be provided in order to prevent an uncontrolled flopping of said head and the instrument thereon when the joint is unclamped to allow for adjustment thereof. The uncontrolled flopping of an adjustable head of this type is most apparent when heavy instruments are mounted thereon, and since the instruments which are generally mounted on tripods are precise instruments, and an uncontrolled flopping thereof during adjustment may serve to throw the instrument out of adjustment or cause the stand to tip over, an initial frictional grip in the adjustable joint is required. It is obvious that a given initial friction can be set up in any ball and socket joint at the time of assembly to overcome this uncontrolled movement, but after repeated use, an initial adjustment set up in a point in this manner will soon lose its effect due to frictional wear. Along with an initial friction in a ball and socket joint for this purpose, it is necessary to have a clamping adjustment by means of which joints can be rigidly locked in a given position in a rapid, effortless manner with the use of only one hand so that the other hand will be free to steady the tripod head and the instrument thereon until clamped in a given position.

Therefore, one object of my invention is to provide a novel ball and socket joint for an adjustable tripod head which is provided with an adjustment by means of which the initial friction in the joint can be regulated to prevent uncontrolled flopping of the head regardless of the weight of the instrument mounted thereon. Another object is to provide an adjustable joint of this type which is provided with an adjustment by means of which the initial friction in the joint can be maintained regardless of the frictional wear between the relatively moveable parts. Another object is to provide a ball and socket joint for an adjustable tripod head in which the socket is provided with a second or clamping adjustment by means of which the joint can be rigidly clamped in a given position, the effectiveness of said clamping adjustment depending upon the initial friction set up in the joint by the first adjustment. And still another object is to provide a clamping adjustment for a ball and socket joint whereby the joint can be rigidly clamped in a given position with one hand thereby leaving the other hand free to steady the head and the instrument mounted thereon. And another object is to provide a clamping adjustment for a ball and socket joint whereby the adjustment is affected by means of a cam faced lever. And another object is to provide a ball and socket joint in which the socket is split and is provided with two adjustments, the first adjustment for altering the initial friction in the joint and accounting for frictional wear therein, and a second or clamping adjustment by means of which the joint is rigidly clamped by the actuation thereof depending upon the setting of the first adjustment.

Briefly, the socket of my novel ball and socket joint is formed by mounting two suitably formed half castings onto the under side of the tripod bed in such a way that they are adapted to be substantially separated from one another, but form a socket into which a spherical end on the vertical supporting member of a tripod is adapted to be rotatably seated. Each half casting is provided with a pair of diametrically disposed apertured bearing portions so that the apertured bearing portions of one-half are in alignment with the apertured bearing portions of the other half. An initial friction is adapted to be set up between the socket and the ball by adjusting a bolt extending through one pair of aligned apertured bearing portions, said adjustment being provided to take up for frictional wear in the joint and to set up an initial friction sufficient to overcome an uncontrolled flopping of the tripod head depending upon the weight of the camera mounted thereon. A second bolt is adapted to extend through the other pair of apertured bearing portions, the tension on said bolt being effected by means of a cam faced clamping lever pinned to one end thereof. An actuation of said clamping lever causes the bolt fixed thereto to pull the two socket parts together, and since the amount of adjustment caused by said lever is limited by the dimensions of the cam faced portion thereon, a rigid clamping between the ball and socket is not accomplished unless the initial friction set up in the joint by the first adjustable bolt is within certain limits.

The novel features that I consider characteristic of my invention are set forth with particularity in the appended claims. The invention itself, however, both as to its organization and its method of operation, together with additional objects and advantages thereof, will best be understood from the following description of the specific embodiments when read in connection with the accompanying drawing in which—

Like reference characters refer to corresponding parts in the several figures.

Figure 1:
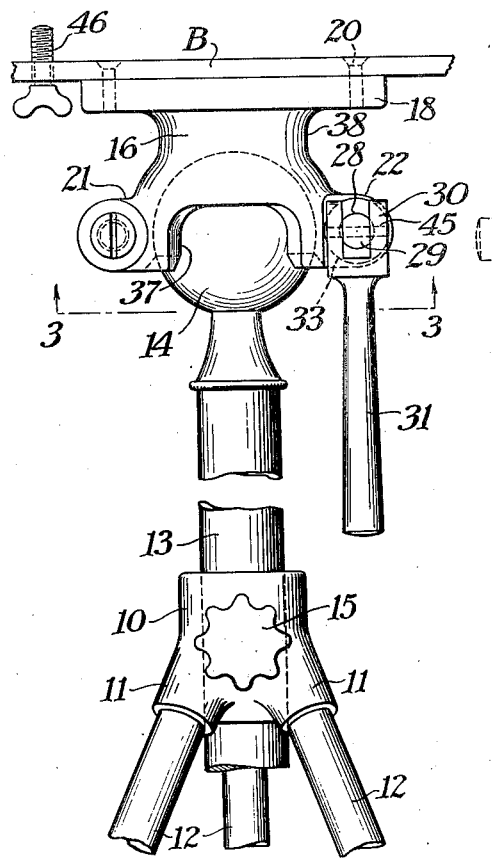
Figure 1 is a side elevation of an adjustable tripod head embodying my novel ball and socket joint.

Referring now to the drawing, 10 indicates a tubular member which is provided with a plurality of branching members 11 in which legs 12 are adapted to be mounted in any suitable manner. The supporting member 13, having a spherical end 14 attached thereto in any suitable manner, is adapted to telescope within the tubular member 10, and can be held in any desired vertical adjustment by tightening the clamping screw 15 which extends into the tubular member 10.

Figure 4:
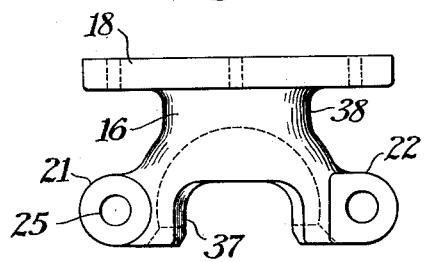
Figure 4 is a side elevation of one of the half castings forming the socket.

A socket in which the spherical member 14 is adapted to be rotatably seated is formed by mounting two half castings 16 and 17, see Fig. 4, each half casting being identical as to shape and form with the other. Castings 16 and 17 each include flanges 18 and 19, said flanges being an integral part of each of the castings. Casting 16 is attached to the underside of the bed plate B by means of a plurality of screws 20, the spherical member 14 is then located properly in this portion of the socket, and then the casting 17 is attached to the underside of the bed plate B in such a way as to form a socket with a casting 16 with the spherical member 14 rotatably seated therein. In the assembled position, the two castings 16 and 17 are substantially separated from one another, as shown at 20a, for purposes described hereinafter.

Casting 16 is provided with two bearing portions 21 and 22 diametrically disposed on the casting relative to one another. Casting 17 is provided with two similar bearing portions 23 and 24, bearing portion 23 being in alignment with bearing portion 21, while bearing portion 22 is in alignment with bearing portion 24, when the two castings are so mounted on the bed plate B as to form a socket. Bearing portions 21 and 23 are provided with aligned apertures 25 and 26 respectively, aperture 26 in the casting 17 being tapped to receive a bolt 27 having a threaded end, while aperture 25 is reamed out a little larger than aperture 26 so that the threaded portion of the bolt 27 can be passed therethrough freely.

Bearing portions 22 and 24, in castings 16 and 17 respectively, are also provided with a pair of aligned apertures through which a tie-bolt 28 is adapted to extend. The tie-bolt 28 is of sufficient length to extend past the bearing portion 22 when in its assembled position, and the end 29 of the bolt 28 is milled down to receive the yoke end 30 on the clamping lever 31. The clamping lever 31 is eccentrically pinned to the end of the tie-bolt 28 by pin 45 so that a cam faced end 32 on the yoke member 30 is adapted to act against a washer 33 which is positioned between it and the face of the bearing portion 22 to cause a tension on the tie-bolt 28 and a clamping of the socket when the clamping lever 31 is lowered to the position shown in full line in Figure 2. The cam faced end 32 of the yoke member, and the washer 33 on which said cam faced portion acts, are both case hardened to withstand the continuous frictional engagement to which they are subjected without suffering any appreciable frictional wear. Castings 16 and 17 are purposely cut away on the side as shown at 37, and made narrow at the neck 38 so that when the adjusting screw 27 is tightened down, or the clamping lever 31 is lowered to a clamping position, the lower portions of the castings engaging the spherical member 14 will be allowed to flex towards each other to effect the desired gripping action on said spherical member 14 without drawing the castings as a whole away from the bed plate B on which they are fixedly mounted.

In operation, the clamping adjustment of the ball and socket joint through the actuation of the clamping lever 31 is entirely dependent upon the initial frictional adjustment set up in the joint by the adjusting bolt 27. The instrument to be mounted on the tripod may be placed on the bed plate B in any suitable manner, and for the purpose of illustration I have shown the usual method of having a threaded bolt 46 extending through the bed plate B, said bolt being adapted to be screwed into a suitable threaded socket provided in the base of the instrument, not shown. After the instrument is mounted on the bed plate B, the adjusting bolt 27 is tightened down until a sufficient friction is set up in the ball and socket joint to prevent an uncontrolled flopping of the instrument mounted thereon. The extent of the adjustment necessary in bolt 27 will depend upon the weight of the instrument that is mounted on the bed plate B, because the heavier the instrument the greater will be the tendency for the bed plate B, and the socket fixed thereto, to rotate on the spherical member 14. After a sufficient friction has been set up in the ball and socket joint by the adjusting screw 27 to allow the plate B and an instrument mounted thereon to be tilted with one hand, the socket can be rigidly fixed to the spherical member 14 by depressing the clamping lever 31 from the dotted or unlocked position shown in Figure 2, to the clamping position shown in full lines. It will be readily understood by one skilled in the art that the amount of frictional adjustment between the socket and the spherical member 14 that can be set up by the clamping lever 31, is definitely fixed by the eccentricity of the mounting of the lever 31 on the tie-bolt 28 in conjunction with the dimension of the cam face 32 on the yoke portion 30 of said clamping lever 31. Therefore, if the initial frictional engagement set up in the joint by the adjustment of the adjusting bolt 27 is too loose, the locking adjustment of the clamping lever 31 will not be sufficient to rigidly attach the socket to the spherical member 14.

Figure 2:
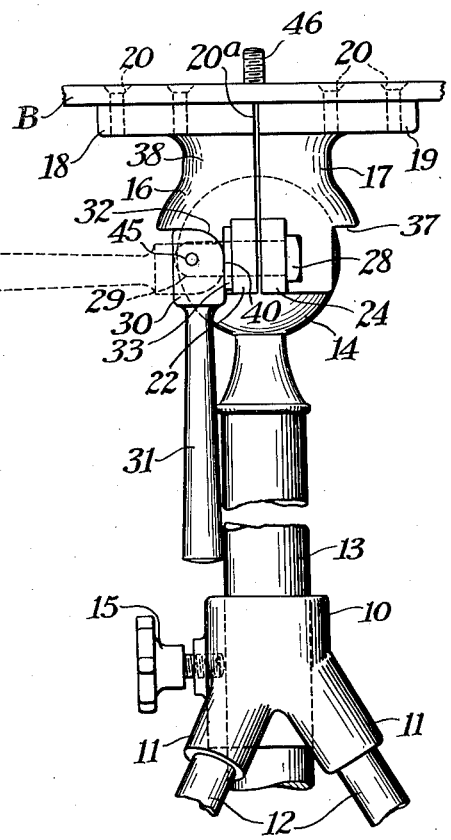
Figure 2 is an end elevation of the adjustable tripod head showing the clamping lever in its locking and unlocking positions.
Figure 3:
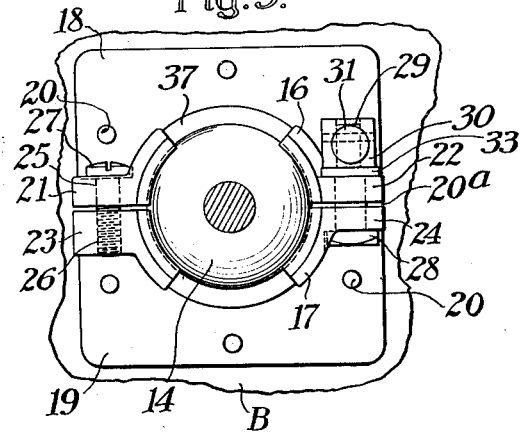
Figure 3 is a section taken on line 3—3 of Figure 1.

On the other hand, if the initial frictional engagement set up in the joint by the adjusting bolt 27 is too great, it will be impossible to move the clamping lever 31 into its full clamping position shown in full lines in Figure 2. Cam face 32 of the clamping lever 31 is so formed, that in its clamping position, a flat portion 40 is adapted to engage the washer 33 so that the lever will remain in a locking position without being held. Therefore, if the clamping lever 31 is prohibited from being moved to its full locking position, as would be the case when the initial friction set up in the joint by the adjusting bolt 27 was too great, the clamping lever would stop with the rounded portion of the cam face 32 engaging the washer 33, and would fly back to its unlocking position if it were not held in position by the operator.

From the above discussion it will be readily understood that my novel ball and socket joint provides a very satisfactory connection between an adjustable tripod head and a tripod stand. By using this type of joint, an adjustable head is provided by means of which a wide range of angular adjustments are possible, uncontrolled flopping of the head due to frictional wear, or varying weights of the instruments mounted thereon can be accounted for by an initial adjustment, and finally a rigid clamping of the joint can be affected by a single motion of one hand without requiring a great amount of force. Although the locking of the joint by the actuation of clamping lever 31 is entirely dependent upon the initial adjustment set up in the joint by the adjusting screw 27, it is to be understood that the initial adjustment required of bolt 27 is not as critical as it might appear to be from a word description of this ball and socket joint.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare as new and desire to secure by Letters Patent is:

1. A ball and socket joint for an adjustable tripod head comprising a supporting member having a spherical end, a socket member adapted to engage the spherical end, said socket member comprising two parts, a pair of bearing portions on each part of said socket member one being diametrically disposed with respect to the other, a camera supporting plate fixedly carrying each of the two parts whereby their corresponding bearing portions are in alignment and substantially displaced from each other so as to loosely engage the spherical end and confine the supporting plate thereto, an adjustable connecting means adapted to connect two adjacent bearing portions of the socket member parts whereby an initial frictional grip between the socket member and the spherical end can be set up, a clamping means adapted to connect the other two adjacent bearing portions, said clamping means including a cam ended lever the actuation of which is adapted to rigidly attach the socket member to the spherical end depending upon the initial friction set up therebetween by said adjustable connecting means.

2. A ball and socket joint for an adjustable tripod head, comprising a supporting member having a spherical end, a socket member split into two parts adapted to engage said spherical end, a pair of diametrically disposed bearing portions on each of said two socket parts, said bearing portions being provided with apertures, a camera supporting plate fixedly carrying each of the two parts of said socket member whereby their apertured bearing portions are in alignment and substantially displaced from one another so as to loosely engage the spherical end and confine the supporting plate thereto, an adjustable bolt extending through two of said aligned apertured bearing portions whereby an initial gripping friction can be set up between the socket and the spherical end, a tie-bolt extending through the other pair of aligned apertured bearing portions, and a clamping lever fixed to said tie-bolt whereby actuation of said clamping lever may rigidly attach the said socket to the spherical end depending upon the initial adjustment of said adjustable bolt.

3. A ball and socket joint for an adjustable tripod head, comprising a supporting member having a spherical end, a socket member split into two parts and adapted to engage said spherical end, a camera supporting plate fixedly carrying each of the two parts of said socket member so that said parts are slightly separated to loosely engage the spherical end and confine the supporting plate thereto, an adjustable connecting means holding the two parts of the split socket member together at one side thereof and adapted to set up an initial frictional grip between the socket member and the spherical end confined therein, a tie-bolt adjustably holding the two parts of said socket together and being diametrically located across said socket with respect to said connecting means, and a clamping means connected to said bolt whereby the actuation of the clamping means may rigidly attach the split socket to the spherical end depending upon the initial adjustment of said connecting means.

BERNARD A. HULTQUIST.